United States Patent [19]
Goto et al.

[11] Patent Number: 4,597,295
[45] Date of Patent: Jul. 1, 1986

[54] ELECTROMAGNETIC FLOWMETER

[75] Inventors: Shigeru Goto; Toshio Sekiguchi, both of Tokyo, Japan

[73] Assignee: Yokogawa Hokushin Electric Corporation, Tokyo, Japan

[21] Appl. No.: 702,493

[22] Filed: Feb. 19, 1985

[30] Foreign Application Priority Data

Mar. 16, 1984 [JP] Japan ................................. 59-50732

[51] Int. Cl.$^4$ ............................................... G01F 1/60
[52] U.S. Cl. .................................................... 73/861.17
[58] Field of Search ...................... 73/861.16, 861.17; 128/691, 692

[56] References Cited

U.S. PATENT DOCUMENTS

| | | | |
|---|---|---|---|
| 4,409,846 | 10/1983 | Ueno | 73/861.17 |
| 4,412,545 | 11/1983 | Okino et al. | 73/861.17 |

Primary Examiner—Herbert Goldstein
Attorney, Agent, or Firm—Moonray Kojima

[57] ABSTRACT

An electromagnetic flowmeter is energized by a tri-state excitation system having a first quiescent period, a first excitation period, a second quiescent period, a second excitation period for excitation with a polarity opposite to that of the first excitation period, and a third quiescent period. The electrode signals are sampled at equal intervals in each period except the second quiescent period and combined to provide an output which eliminates noise due to residual magnetic flux, electrochemical effects and commercial frequency.

7 Claims, 2 Drawing Figures

ELECTROMAGNETIC FLOWMETER

BACKGROUND OF THE INVENTION

1. Field of Invention

This invention relates to electromagnetic flowmeters energized by tri-state excitation of a rectangular waveform; and, more particularly, to such electromagnetic flowmeters which are substantially free of noise.

2. Description of Prior Art

The trend of developement of electromagnetic flowmeters has been from a conventional excitation system utilizing a commercially available frequency, toward excitation systems utilizing low-frequency rectangular waveforms with good stability at a zero point. The rectangular waveform excitation systems include bi-state excitation systems wherein the flowmeter is excited with two values, a positive value and a negative value; and tri-state excitation systems wherein the flowmeter is excited with the above two values (i.e. a positive value and a negative value) and a zero excitation period before and after the two values. These excitation systems produce different types of noise between the electrodes of a detection system disposed in the flowmeter. The noises are removed by various arithmetic systems which have advantages and disadvantages.

Known signal processing systems for removing noise produced in the tri-state excitation systems are disclosed, for example, in Japanese Laid-open Patent Publication Nos. 53-75966 and 57-149919. However, these prior systems do not take into account the fact the magnetic core used in the excitation system or the magnetic casing used in the flowmeter, such as for passing the fluid, is usually used as a return path for magnetic flux applied to the fluid to be measured. More specifically, the core or casing is magnetic and hence exhibits magnetic hysteresis. Thus, a residual magnetic field remains applied by the core or casing to the fluid, even during quiescent periods during which excitation current is no longer applied to the excitation system.

Stated otherwise, an electromotive force, responsible for error, is generated due to the residual magnetic field and the flow speed of the fluid during the quiescent period when no electric current is applied. Such electromotive force has different polarities dependent on the hysteresis even if the flow rate of the fluid is constant, since the residual magnetic field has opposite polarities in the quiescent period wherein the exciting current falls from a positive mode to zero, and in a quiescent period wherein the exciting current falls from a negative mode to zero. No highly accurate detection of flow rates is therefore possible with the conventional noise removing system wherein no provision is made for noise resulting from the magnetic hysteresis of various flowmeter components.

SUMMARY OF THE INVENTION

Accordingly, an object of the invention is to overcome the aforementioned and other disadvantages and deficiencies of the prior art.

Another object is to provide an electromagnetic flowmeter energized by tri-state excitation, which is free from the influence of residual magnetic fields.

The foregoing and other objects are attained by the invention which encompasses an electromagnetic flowmeter which is excited by rectangular waveforms and which comprises excitation means for exciting the flowmeter through repeated cycles, each comprising a first quiescent period, a first excitation period, a second quiescent period, a second excitation period for exciting with a polarity opposite to that of the first excitation period, and a third quiescent period; sampling means for sampling a signal from electrodes disposed in the flowmeter and in contact with the fluid to be measured, at equal sampling intervals in each of the periods, except the second quiescent period; and arithmetic means for effecting an arithmetic operation indicated by $(Z_{01} - 2M_1 + 2M_2 - Z_{03})$ using a sampled value $Z_{01}$ in the first quiescent period, a sampled value $M_1$ in the first excitation period, a sampled value $M_2$ in the second excitation period, and a sampled value $Z_{03}$ in the third quiescent period, and thereby removing the influence of residual magnetic field during the quiescent periods.

DETAILED DESCRIPTION OF PREFERRED EMBODIMENTS

Figure 1:
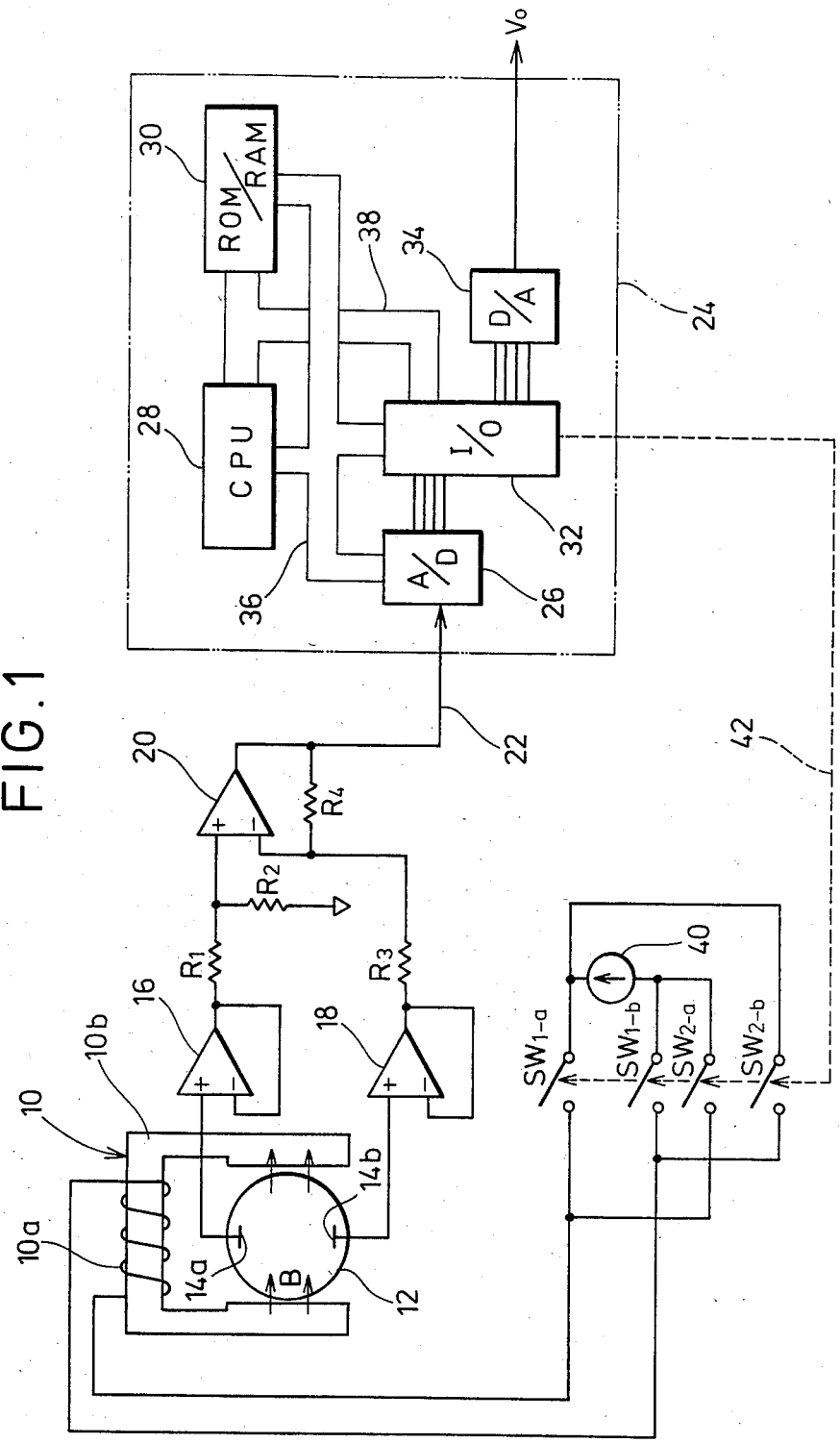
FIG. 1 is a block diagram depicting an illustrative embodiment of the invention.

Turning now to FIG. 1, an excitation assembly 10 is depicted comprising an excitation coil 10a and a magnetic core 10b. A conduit or casing 12 having a inner surface lined with an insulating material, is filled with a fluid to be measured. Electrodes 14a, 14b are disposed in conduit 12 in alignment with each other in a direction normal to a magnetic filed, as shown by arrows B, generated by excitation coil 10a and core 10b. The electrodes 14a, 14b are connected to the non-inverting input terminals of buffer amplifiers 16, 18 which have high input impedance. The inverting input terminals are connected to the output terminals thereof, as depicted. A differential amplifier 20 is supplied with outputs from buffer amplifiers 16, 18 through resistors R1–R4 for removing in-phase noise from the supplied signals. An output voltage from the differential applifier 20 is applied via connection 22 to a microcomputer 24. Microcomputer 24 comprises an analog-to-digital converter (hereinafter called "A/D") 26, which is capable of sampling the differential amplifier output voltage fed through connection 22; a microprocessor (hereinafter called "CPU") 28; a memory (ROM/RAM) 30; an input/output port (I/O) 32; a digital-to-analog converter (hereinafter called "D/A") 34; an address bus 36; and a data bus 38. The microcomputer 24 processes the supplied signal and produces a final output $V_0$.

Figure 2:
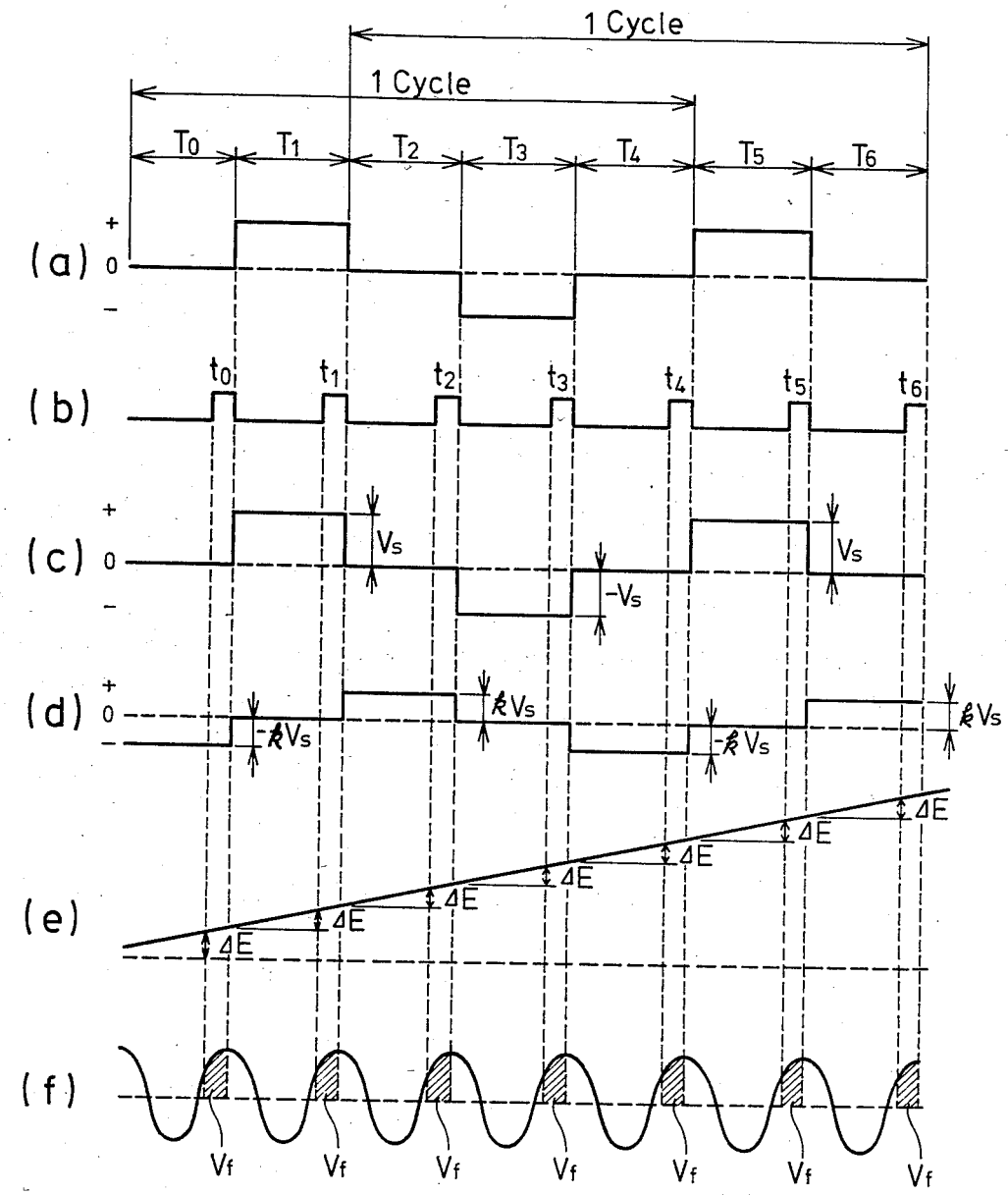
FIG. 2, comprising lines (a) through (f), is a diagram depicting waveforms of excitation signals, sampling signals, and resulting signals as applied to and obtained from the embodiment.

Turning now to FIG. 2, line (a) shows waveforms of an exciting current which is applied to and flow through the exciting coil 10a of excitation system 10. FIG. 2, line (b) shows the times ($t_0 \ldots t_6$) for sampling a voltage generated between the electrodes 14a, 14b disposed in casing 12 through which the fluid to be measured for flow rate flows. Line (c) shows the waveforms of a signal voltage generated between electrodes 14a and 14b as a result of excitation applied to the excitation assembly 10 and being dependent upon the flow rate of the fluid in casing 12. Line (d) shows the waveform of a noise voltage through electrodes 14a, 14b which is generated during the quiescent period $T_0$, $T_2$, $T_4$, $T_6$, etc, due to a residual magnetic field in the return path for the magnetic flux, such as through the core 10b and casing 12. Line (e) shows the waveform of an electrochemical noise voltage generated on the electrode surfaces between electrodes 14a, 14b. Line (f) shows the waveform of a noise voltage of a commercial frequency which is induced by a commercially available power supply. The various noises are those which affect the flowmeter measurement signals and are dealt with by the invention in the manner described below.

Excitation coil 10a is connected to a DC constant current regulated power source 40 through switches SW1-a, SW1-b, SW2-a, SW2-b which are opened and closed by a timing signal 42 from CPU 28 via input/output port 32 so that an exciting current having a rectangular waveform will flow. The current has a cycle comprising five periods T0 through T4 as shown in FIG. 2, line (a). The periods are a first quiescent period T0 for zero excitation, a first excitation period T1 for positive excitation, a second quiescent period T2 for zero excitation, a second excitation period T3 for negative excitation, and a third quiescent period T4 for zero excitation. These periods have substantially equal intervals of time, and the excitation frequency is selected to be, for example, 50/4 Hz.

The output voltage from the differential amplifier 20 is sampled by the A/D converter 26 at times specified by CPU 28, e.g. times $t_0$, $t_1$, $t_2$, $t_3$ and $t_4$, respectively, in excitation periods $T_1$, $T_3$, in quiescent periods $T_0$, $T_4$, and immediately before the exciting current changes, as depicted in FIG. 2, line (b). The digitalized data is then stored in memory 30.

CPU 28 effects an arithmetic operation on one set of four data items, respectively, at the times $t_0$, $t_1$, $t_2$, $t_3$, $t_4$ while updating the data items, one by one, which are obtained in a time series, and outputs the results of the arithmetic operation.

The electrodes 14a, 14b disposed in the casing 12 produces therebetween a signal voltage Vs, −Vs. These are shown in FIG. 2, line (c) and correspond to the waveform of the exciting current shown in FIG. 2, line (a). During the quiescent periods in which the exciting current of FIG. 2, line (a) is zero, or during periods $T_0$, $T_2$, $T_4$, $T_6$, a noise voltage due to residual magnetic fluxes Br, −Br from core 10b is produced between electrodes 14a, 14b as shown in FIG. 2, line (d).

The noise voltage, as illustrated in FIG. 2, line (d) is produced because of the magnetic hysteresis curve (B-H curve) of core 10b. When the residual magnetic flux is −Br, in the quiescent period $T_0$, a noise voltage −kVs (wherein k is a constant) which is proportional to the flow speed of the fluid being measured, is produced. Then, positive excitation is reached in excitation period $T_1$. When a positive residual magnetic flux +Br is produced in the quiescent period for positive excitation, a noise voltage +kVs which is proportional to the flow speed or rate of the fluid is produced. This is followed by negative excitation period $T_3$ and then by quiescent period $T_4$ during which the original point on the B-H curve is reached, and noise voltage −kVs is produced.

Stated otherwise, the B-H curve is cyclically followed in cycles comprising the quiescent period $T_0$ through quiescent period $T_4$ which are signal sampling periods.

FIG. 2, line (e) illustrates electrochemical noise which is produced between electrodes' surfaces and the fluid. The electrochemical noise increases at a constant rate in time. Assuming that the initial level of the electrochemical noise at the sampling time $t_0$ is E, the electrochemical noise increases at a constant rate ΔE, in each sampling time ($t_1$–$t_6$).

FIG. 2, line (f) shows the manner in which noise induced by the frequency of a commercial supply is sampled. The commercial frequency induced noise is indicated by a sine wave, and the signal is sampled at times $t_0$–$t_6$ which are in phase with the commercial power supply. Thus, a noise voltage Vf is sampled at each of the sampling times.

Data items $V_{00}$–$V_{06}$ sampled at times $t_0$–$t_6$ by A/D converter 26 under control of CPU 28 are the sum of a signal voltage proportional to the flow rate of the fluid and the excitation current, as shown in FIG. 2, line (c), a noise voltage generated due to the residual magnetic field from the core in proporation to the flow rate of the fluid, as shown in FIG. 2, line (d), an electrochemical noise, as shown in FIG. 2, line (e), and a commercial frequency induced noise, as shown in FIG. 2, line (f).

Using the reference characters shown in FIG. 2, the components contained in each data item are expressed as follows:

$$V_{00} = -kVs + E + Vf \quad \text{(at time } t_0\text{)} \tag{1}$$

$$V_{01} = Vs + E + \Delta E + Vf \quad \text{(at time } t_1\text{)} \tag{2}$$

$$V_{02} = kVs + E + 2\Delta E + Vf \quad \text{at time } t_2 \tag{3}$$

$$V_{03} = -Vs + E + 3\Delta E + Vf \quad \text{(at time } t_3\text{)} \tag{4}$$

$$V_{04} = -kVs + E + 4\Delta E + Vf \quad \text{(at time } t_4\text{)} \tag{5}$$

$$V_{05} = Vs + E + 5\Delta E + Vf \quad \text{(at time } t_5\text{)} \tag{6}$$

$$V_{06} = kVs + E + 6\Delta E + Vf \quad \text{(at time } t_6\text{)} \tag{7}$$

These sampled values are successively stored in memory 30. Different formulas for calculating the signal voltage Vs only from the stored sampled values are used, depending on the following conditions.

(A) When starting at a time prior to positive excitation ($t_0$, $t_4$)

The formula used in this condition is as follows:

$$V_p - V_{00} + 2V_{01} - 2V_{03} + V_{04} \tag{8}$$

wherein Vp is the signal voltage to be determined. Then, by putting equations (1), (2), (3) and (5) into formula (8)

$$V_p = 4Vs \tag{9}$$

The result is the signal voltage from which each noise voltage has been removed.

(B) When starting at a time prior to negative excitation ($t_2$, $t_6$).

The formula used in this condition is as follows.

$$V_N = V_{02} - 2V_{03} + 2V_{05} - V_{06} \tag{10}$$

$$V_N = -(-V_{02} + 2V_{03} - 2V_{05} + V_{06}) \tag{10'}$$

wherein $V_N$ is the signal voltage to be determined. By putting equations (3), (4), (6) and (7) into formula (10')

$$V_N = -4Vs \tag{11}$$

The result is the signal voltage from which each noise voltage has been removed.

Comparison between conditions (A) and (B) indicates that only the sign of the calculated output differs when starting at a time prior to positive excitation and when starting at a time prior to negative excitation.

The above formulas are stored in the ROM of memory 30 and executed under control of CPU 28. The result is supplied as the final output $V_0$ through I/O port 32 and D/A converter 34.

No mention has been made thus far of differential noise, such as produced when a magnetic field intersects the area normal thereto and formed by the fluid being measured and signal lead wires extending from the electrodes 14a, 14b, at the time the excitation current is switched. The differential noise can be removed by known means such as by means for reducing the above area, and no problem would occur if it were not removed by using the formulas.

An arithmetic operation may be effected which employes both of the formulas (8) and (10), rather than one of them. For example, after an output of an arithmetic operation has been generated with the quiescent periods $T_0$ through $T_4$ as one cycle, an arithmetic operation may be carried out with the quiescent periods $T_2$ through $T_6$ as another cycle. The result of the latter arithmetic operation is inverted in sign so that successive outputs will be generated. This arrangement has the advantage of increased response speed.

The invention provides a highly accurate electromagnetic flowmeter which is free from the influence of residual magnetic field upon the tri-state excitation, when using a core or casing as a return path for the magentic flux. Since the flowmeter is not subjected to influence of residual magnetic field from the core or casing, the material thereof can be selected as desired. Thus, the flowmeter can be manufactured at optimal low cost and at the same time retain a desired level of high accuracy.

The mechanism for measuring the flow rate by the use of magnetic field in the fluid flow is known and hence is not explained in detail herein. It is to be understood the CPU and other control mechanisms and programs are suitably prepared and employed to carry out the arithmetic operations discussed herein to achieve the noise removal from the output signal.

The foregoing description is illustrative of the principles of the invention. Numerous modifications and extensions thereof would be apparent to the worker skilled in the art. All such modifications and extensions are to be considered to be within the spirit and scope of the invention.

What is claimed is:

1. An electromagnetic flowmeter excited by a rectangular waveform, comprising
    excitation means for providing excitation to said flowmeter through repeated cycles, each comprising a first quiescent period, a first excitation period, a second quiescent period, a second excitation period for excitation with a polarity opposite to that of said first excitation period, and a third quiescent period;
    sampling means for sampling a signal from electrodes of said flowmeter at equal sampling intervals in each of the periods except said second quiescent period; and
    arithmetic means for effecting an arithmetic operation indicated by $(Z_{01} - 2M_1 + 2M_2 - Z_{03})$ using a sampled value $Z_{01}$ in said first quiescent period, a sampled value $M_1$ in said first excitation period, a sampled value $M_2$ in said second excitation period, and a sampled value $Z_{03}$ in said third quiescent period.

2. The flowmeter of claim 1, wherein said excitation means provides positive excitation in said first excitation period, said cycles being started from said first quiescent period to carry out said arithmetic operation.

3. The flowmeter of claim 1, wherein said excitation means provides negative excitation in said first excitation period, said cycles being started from said first quiescent period to carry out said arithmetic operation.

4. The flowmeter of claim 1, wherein said arithmetic means provides an arithmetic operation with positive excitation in said first excitation period and said cycles started from said first quiescent period, and an arithmetic operation with negative excitation effected in said first excitation period and said cycles started from said first quiescent period, said arithmetic operations being alternately carried out.

5. The flowmeter of claim 1, wherein said arithmetic means comprises a microcomputer.

6. The flowmeter of claim 1, wherein said excitation means comprises means for switching an output from a constant current regulated power supply under command from a microcomputer.

7. The flowmeter of claim 1, wherein said sampling means samples voltage from said electrodes in a prescribed period immediately prior to switching of exciting periods.

* * * * *